US010621497B2

(12) United States Patent
Farrell et al.

(10) Patent No.: US 10,621,497 B2
(45) Date of Patent: Apr. 14, 2020

(54) ITERATIVE AND TARGETED FEATURE SELECTION (71) Applicant: International Business Machines Corporation, Armonk, NY (US)

(72) Inventors: Robert G. Farrell, Cornwall, NY (US); Oktie Hassanzadeh, Port Chester, NY (US); Mohammad Sadoghi Hamedani, Chappaqua, NY (US); Meinolf Sellmann, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 15/241,565

(22) Filed: Aug. 19, 2016

(65) Prior Publication Data
US 2018/0053095 A1 Feb. 22, 2018

(51) Int. Cl.
| | |
|---|---|
| G06N 5/02 | (2006.01) |
| G06F 16/00 | (2019.01) |
| G06F 16/28 | (2019.01) |
| G06F 16/901 | (2019.01) |
| G06N 20/00 | (2019.01) |

(52) U.S. Cl.
CPC ............. G06N 5/022 (2013.01); G06F 16/00 (2019.01); G06F 16/28 (2019.01); G06F 16/9024 (2019.01); G06N 20/00 (2019.01)

(58) Field of Classification Search
CPC ..................................................... G06N 20/00
See application file for complete search history.

(56) References Cited

U.S. PATENT DOCUMENTS

| | | |
|---|---|---|
| 8,595,154 B2 | 11/2013 | Breckenridge et al. |
| 8,751,273 B2 | 6/2014 | Pinto et al. |
| 10,192,172 B2 | 1/2019 | Chan et al. |

(Continued)

OTHER PUBLICATIONS

"Similarity-margin based feature selection for symbolic interval data," Lyamine Hedjazi, Joseph Aguilar-Martin, Marie-Véronique Le Lann, Pattern Recognition Letters 32 (2011) 578-585 (Year: 2011).*

(Continued)

*Primary Examiner* — Hal Schnee
(74) *Attorney, Agent, or Firm* — Ryan, Mason & Lewis, LLP (57) ABSTRACT

Methods, systems, and computer program products for iterative and targeted feature selection are provided herein. A computer-implemented method includes generating a first prediction value for a variable attribute of a set of objects by executing a predictive model that comprises a set of features for the set of objects; evaluating the prediction error of the predictive model based on said first prediction value; generating additional features upon a determination that the prediction error exceeds a threshold; incorporating the additional features into the predictive model, generating an updated predictive model; generating a second prediction value for the variable attribute by executing the updated predictive model; evaluating the prediction error of the updated predictive model based on said second prediction value; and outputting the second prediction value to a user upon a determination that the prediction error of the updated predictive model is below the threshold.

18 Claims, 5 Drawing Sheets

(56) References Cited

U.S. PATENT DOCUMENTS

| | | | |
|---|---|---|---|
| 10,366,346 B2 | 7/2019 | Achin et al. | |
| 10,380,503 B2 | 8/2019 | Stajner | |
| 2008/0154821 A1* | 6/2008 | Poulin | G06Q 10/04 706/21 |
| 2010/0150448 A1* | 6/2010 | Lecerf | G06K 9/2072 382/190 |
| 2010/0161385 A1 | 6/2010 | Karypis et al. | |
| 2013/0177244 A1* | 7/2013 | Liu | G06K 9/6263 382/173 |
| 2014/0330758 A1 | 11/2014 | Yu | |
| 2014/0372346 A1* | 12/2014 | Phillipps | G06N 20/00 706/12 |
| 2015/0112902 A1* | 4/2015 | Unno | G06N 20/00 706/12 |
| 2015/0254510 A1* | 9/2015 | McKinnon | G06F 16/50 382/103 |
| 2015/0261837 A1* | 9/2015 | Avasthi | G06F 16/3334 707/602 |
| 2015/0379430 A1* | 12/2015 | Dirac | G06N 20/00 706/12 |
| 2016/0292241 A1* | 10/2016 | Patterson | G06F 16/254 |
| 2017/0213153 A1* | 7/2017 | Wang | G06N 20/00 |
| 2017/0220954 A1* | 8/2017 | Suryakantha | G06N 7/00 |
| 2017/0255952 A1* | 9/2017 | Zhang | G06Q 30/0205 |
| 2017/0371897 A1* | 12/2017 | Strong | G06Q 50/16 |

OTHER PUBLICATIONS

"Feature selection using fuzzy entropy measures with similarity classifier," Pasi Luukka, Expert Systems with Applications 38 (2011) 4600-4607 (Year: 2011).*

"Unsupervised Feature Selection Using Feature Similarity," Pabitra Mitra, IEEE Transactions on Pattern Analysis and Machine Intelligence, vol. 24, No. 3, Mar. 2002 (Year: 2002).*

B. Roth et al., "Minimally Supervised Event Argument Extraction Using Universal Schema," in 4th Workshop on Automated Knowledge Base Construction (AKBC) at NIPS, Dec. 2014, 5 pages.

Neelakantan et al., "Knowledge Base Completion Using Compositional Vector Space Models," Workshop on Automated Knowledge Base Construction (AKBC) at NIPS, 2014, 6 pages.

H.H. Inbarani et al., "Supervised Hybrid Feature Selection Based on PSO and Rough Sets for Medical Diagnosis," Computer Methods and Programs in Biomedicine, Jan. 2014, pp. 175-185, vol. 113, No. 1.

Glenn Hofford, "Structure Logic: A New Method that Enables Richer Meaning Representations," IP.com No. IPCOM000235703D, Mar. 21, 2014, 447 pages.

N. Kumar et al., "Machine Learning Based Predictive Model for Analysing the Sentiments in Short Text," IP.com No. IPCOM000239081D, Oct. 10, 2014, 10 pages.

Mohammad J. Saberian, "Boosting Algorithms for Simultaneous Feature Extraction and Selection" Computer Vision and Recognition (CVPR), 2012 IEEE Conference, Jun. 16-21, 2012, pp. 2448-2455.

IBM Cloud Computing Ref. Peter Mell, et al. The NIST Definition of Cloud Computing, NIST Special Publication 800-145, Sep. 2011, pp. 1-7.

Dhir, CS. et al.; "Information-theoretic feature extraction and selection for robust classification"; Proceedings of the SPIE—The International Society for Optical Engineering, vol. 7343, (12 pp.); 2009.

Zhou et al., Streamwise Feature Selection. Journal of Machine Learning Research 7 (2006) 1861-1885.

Wang et al., Online Group Feature Selection. Proceedings of the Twenty-Third International Joint Conference on Artificial Intelligence, 2013.

Parikshit Sondhi, "Feature Construction Methods: A Survey," http://sifaka.cs.uiuc.edu/~sondhi1/survey3.pdf, 2009, 8 pages.

T. Mitchell et al., "Never-Ending Learning," Proceedings of the 29th AAAI Conference on Artificial Intelligence, 2015, pp. 2302-2310.

Carlson et al, "Toward an Architecture for Never-Ending Language Learning," Proceedings of the 24th AAAI Conference on Artificial Intelligence, Jul. 2010, pp. 1306-1313.

J.M. Kanter et al, "Deep Feature Synthesis: Towards Automating Data Science Endeavors," International IEEE/ ACM Data Science and Advance Analytics Conference, 2015, 10 pages.

H. Poon et al., "Unsupervised Ontology Induction from Text," Proceedings of the 48th Annual Meeting of the Association for Computational Linguistics (ACL), Jul. 2010, pp. 296-305.

T. Franz et al, "TripleRank: Ranking Semantic Web Data by Tensor Decomposition," Proceedings of the 8th International Semantic Web Conference (ISWC), 2009, pp. 209-224.

M. Nickel et al., "Holographic Embeddings of Knowledge Graphs," arXIV:1510.04935v2 [cs.Al], Oct. 2015, 7 pages.

M. Nickel et al., "Tensor Factorization for Multi-Relational Learning," Proceedings of the European Conference on Machine Learning and Knowledge Discovery in Databases (ECML PKDD), Part III, Sep. 2013, pp. 617-621.

* cited by examiner

ITERATIVE AND TARGETED FEATURE SELECTION

FIELD

The present application generally relates to information technology, and, more particularly, to targeted feature selection techniques.

BACKGROUND

Software systems for predicting variables of interest are utilized in many industries. However, existing approaches require human analysis of unresolved examples and iterative model building that are expensive and time-consuming because multiple manual steps are commonly involved.

SUMMARY

In one embodiment of the present invention, techniques for iterative and targeted feature selection are provided. An exemplary computer-implemented method can include generating a first prediction value for a variable attribute of a set of one or more objects by executing a predictive model, wherein the predictive model comprises a set of features for the set of objects. Such a method can also include evaluating the prediction error of the predictive model based on said first generated prediction value, and generating one or more additional features, from a set of unstructured data associated with the set of objects, upon a determination that the prediction error exceeds a predetermined threshold. Further, such a method can include incorporating the one or more additional features into the predictive model, thereby generating an updated predictive model, and generating a second prediction value for the variable attribute of the set of objects by executing the updated predictive model. Such a method can additionally include evaluating the prediction error of the updated predictive model based on said second generated prediction value, and outputting the second generated prediction value to at least one user upon a determination that the prediction error of the updated predictive model is below the predetermined threshold.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes techniques and systems for efficient online, iterative and targeted feature selection. At least one embodiment of the invention includes building representations based on the improvement (or approval/disapproval) of related predictions. By way of illustration, consider an example representation of a house. With such an example, it is likely not necessary to represent every feature of the house (the color, the texture, etc.). Accordingly, one or more embodiments of the invention include determining a sufficient set of features for the house that will allow a user to differentiate between houses (for purposes of buying or selling a house, for example).

At least one embodiment of the invention can include identifying a set of unresolved examples contributing to error in a predictive model, when run on a full set of examples, wherein the unresolved examples are associated with (or used to retrieve) unstructured data (text, images, etc.). Additionally, such an embodiment can include finding and/or identifying common features in the unstructured data. Such an embodiment can also include incorporating such features into the predictive model (thereby generating an updated predictive model), evaluating the prediction error upon executing the updated predictive model, and outputting at least one example from the full set of examples to at least one user upon a determination that the updated predictive model reduced the prediction error based on the evaluation.

As also detailed herein, a knowledge graph (KG) can provide relationships between concept (or entity) references in unstructured text descriptions. At least one embodiment of the invention includes utilizing these known relationships between entities to propose new features. For example, consider a textual description that describes appliances (such as a dishwasher and a freezer) and another textual description that describes typical activities with such appliances ("washing dishes"). Relationships between the appliances and the activities can be found across one or more unresolved examples (as well as the full set of examples). At least one embodiment of the invention includes using a prediction error to focus the search in the space of possible relationship-based representations.

Illustrative embodiments of the present invention will be described herein, with reference to exemplary computer networks and associated computers, servers, network devices or other types of processing devices. It is to be appreciated, however, that the invention is not restricted to use with such illustrations. By way of example only, the term "computer network" as used herein is intended to be broadly construed, so as to encompass, for example, any system comprising multiple networked processing devices.

Figure 1:
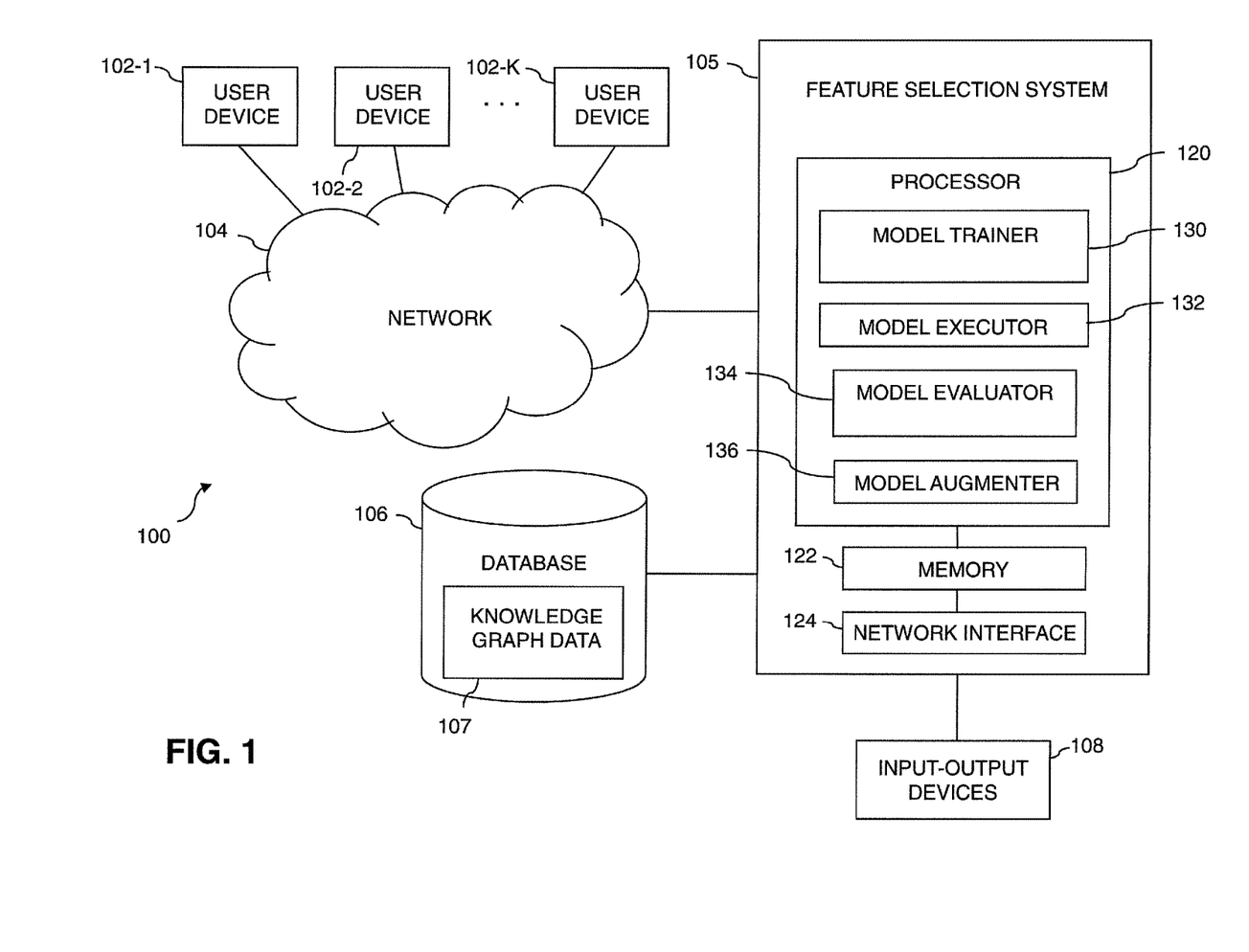
FIG. 1 is a diagram illustrating system architecture, according to an exemplary embodiment of the invention.

FIG. 1 illustrates a system architecture, according to an embodiment of the invention. More specifically, FIG. 1 depicts an example of a computer network 100 configured in accordance with an embodiment of the invention. As depicted, network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a feature selection system 105.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including but not limited to a wide area network (WAN), a local area network (LAN), a satellite network, a telephone or cable network, a cellular network, a wireless network such as a Wi-Fi™ or WiMAX network, or various portions or combinations of these and other types of networks. By way of further example only, the computer network 100 in some embodiments can comprise combinations of multiple different types of networks each comprising processing devices configured to communicate using internet protocol (IP) or other known communication protocols.

In this example, the feature selection system 105 is communicatively coupled to database 106, which is configured to store KG data 107. The database 106 in the one or more embodiments of the invention is implemented using one or more storage systems associated with the feature selection system 105. Such storage systems can comprise any of a variety of different types of storage including but not limited to network-attached storage (NAS), storage area networks (SANs), direct-attached storage (DAS) and distributed DAS, as well as combinations of these and other storage types, including software-defined storage.

Also associated with the feature selection system 105 are input-output devices 108, which illustratively comprise keyboards, displays or other types of input-output devices in any combination. Such input-output devices are used to support one or more user interfaces to the feature selection system 105, as well as to support communication between the feature selection system 105 and other related systems and devices not explicitly shown.

The feature selection system 105 in the FIG. 1 embodiment is assumed to be implemented using at least one processing device. Each such processing device generally comprises at least one processor 120 and an associated memory 122, and implements one or more functional modules for controlling certain features of the feature selection system 105.

More particularly, the feature selection system 105 in this embodiment comprises processor 120 communicatively coupled to memory 122 and a network interface 124. In some embodiments, the processor 120 comprises a microprocessor, a microcontroller, an application-specific integrated circuit (ASIC), a field-programmable gate array (FPGA) or other type of processing elements, as well as portions or combinations of such elements. In some embodiments, the memory 122 comprises volatile and/or non-volatile memory, such as random access memory (RAM), read-only memory (ROM) or other types of memory, in any combination. Memory 122, other memories and other storage devices may be viewed as examples of what are sometimes referred to as "computer-readable storage media" storing one or more executable computer programs, instructions, code and other executables.

One or more articles of manufacture comprising computer-readable storage medium (or media) are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

Referring again to the example depicted in FIG. 1, an interface 124 may comprise one or more conventional transceivers (not depicted) and facilitate feature selection system 105 to communicate locally with one or more input-output devices 108 and remotely (over the network 104) with one or more user devices 102. The processor 120 further comprises a model trainer 130, a model executor 132, a model evaluator 134 and a model augmenter 136. It is to be appreciated that the particular arrangement of modules 130, 132, 134 and 136 illustrated in the processor 120 of FIG. 1 is by way of example only, and alternative arrangements can be used. For example, the functionality associated with the modules 130, 132, 134 and 136 can be combined into a single module, or separated across a larger number of modules. As another example, multiple distinct processors can be used to implement different ones of the modules 130, 132, 134 and 136 or portions thereof.

At least portions of the model trainer 130, model executor 132, model evaluator 134 and model augmenter 136 may be implemented at least in part in the form of software that is stored as an article of manufacture (such as memory 122) and executed by processor 120.

It is to be understood that other embodiments may include fewer, additional or alternative systems, devices and other network entities, as well as different arrangements of modules and other components. By way of example only, in other embodiments, the feature selection system 105 can be eliminated and associated elements such as model trainer 130, model executor 132, model evaluator 134 and model augmenter 136 can be implemented elsewhere in the computer network 100.

An exemplary process utilizing model trainer 130, model executor 132, model evaluator 134 and model augmenter 136 of the feature selection system 105 in computer network 100 will be described in more detail below.

In some embodiments, described in more detail herein, a KG can provide relationships between concepts mentioned in unstructured text descriptions. The feature selection system 105 utilizes such relationships to propose new features.

Specifically, the model trainer 130 can obtain an initial set of features and an initial set of training/test data from database 106 and/or user devices 102. Also, the model trainer 130 can build a model from training data using a current and/or known set of features. As is known, in order to build a model, training data is preferably provided for both output variables and input variables. For example, the model trainer may have values for a "number of bedrooms" variable and a "square footage" variable across a training set of houses. The model trainer can also have values for the price of each of these houses (the output variable). Statistical machine learning methods can then be used to create a model that minimizes prediction error. By way of example only, linear regression may be used to create a model that best fits the data, relating a single input variable to a single output variable. Additionally, multivariate methods can be used on multiple input variables. Also, non-linear regression, neural networks, principal component analysis, and other methods can be employed. In some embodiments, the model created is represented as a mathematical formula relating the input variables to output variables that may have some prediction error. Least squares, deviation from the norm, least absolute deviations, lasso and other methods can be used for quantifying the prediction error between the model and the example representations. Example representations that do not fit the model within an acceptable prediction error are referred to as unresolved examples.

Additionally, the model executor 132 can run a prediction model on the new, supplied, and/or streaming data (such as, for example, new houses being put on the market), and the model evaluator 134 can evaluate the augmented prediction model by testing the sufficiency conditions. If a sufficiency condition fails, at least one embodiment of the invention includes capturing the unresolved examples and generating a request for improvement of the given condition to the model augmenter 136. If the sufficiency conditions pass, at least one embodiment of the invention includes passing the augmented prediction model back to the prediction model executor 132. Further, the model augmenter 136 may search a space of possible representations that may satisfy a failed sufficiency condition and return a best new predictive model to the model evaluator 134.

Also, in one or more embodiments of the invention, data representation can be created by iterating the following steps. A set of noisy, error-prone and/or mislabeled examples—e.g., unresolved examples—contributing to a prediction error can be identified. Also, a request for new features for unresolved examples can be generated, wherein such a request includes a set of sufficiency conditions on the resulting model and a sufficiency condition can include reducing error, improving speed, reducing cost of acquiring a feature, improving orthogonality of the feature space, etc. Further, proposed new features can be generated from relationships associated with one or more unresolved examples. For example, if the data include one or more elements that can be linked to a KG, at least one embodiment of the invention can include generating features that are clusters of related elements.

Additionally, a (current) training set can be represented using at least one proposed feature (via replacing an existing feature or merely adding the at least one proposed feature). Subsequently, the predictive model can be re-run using the re-represented training set and the sufficiency conditions on the model can be evaluated. Ultimately, a response to a user request can be generated that includes the proposed feature(s) that maximize the set of sufficiency conditions.

By way merely of illustration, at least one embodiment of the invention can be implemented as depicted via the following example use case. For instance, such an embodiment can include extracting the textual description of a cluster of houses. Such extraction can include, for example, leveraging social networks, social media sources and/or other unstructured streaming or updating sources that include a description of the properties. While such sources may be up-to-date, they may also be noisy. Further, such an example embodiment can include generating one or more linguistic features (such as selected words, for example) from the description, and performing a dependency parse on sentences in the description. Targeted nouns, verbs, and other parts of the parse are subsequently extracted. By way of example, "sewer" and "lightpost" can represent targeted nouns from the sentences.

Additionally, such an example embodiment can include generating terms by combining linguistic variants (for example, "sewer" versus "sewers," and "light post" versus "lightpost"). Also, one or more entities can be resolved by identifying entities as mentions of concepts in a knowledge graph. Additionally, a knowledge graph can be utilized to find relationships between terms that appear in different descriptions and combine them into a group that is a disjunct of the generated linguistic features. For example, the terms "sewage" located at a "sewer" can be combined to "sewage-or-sewer," and "lightpost" shines "light" can be combined to "lightpost-or-light."

Such an example embodiment of the invention can additionally include determining and/or identifying a set of groups (e.g., unresolved examples) in the description, such as a cluster of houses with prices that were not accurately predicted ("sewage-or-sewer" appears in more than one of such noisy examples, for example). It is possible to find a large number of possible features where they are stated explicitly in some text descriptions and omitted in others. For example, houses that do not mention a sewer being close to the house are assumed to not have a sewer nearby. In other cases, a list of such features can be gathered and human users (through crowdsourcing, for example) can be asked to fill-in or check the missing data. Unresolved examples can also be re-represented in terms of one or more new features (such as, for example, square footage, the number of bedrooms, sewage-or-sewer), and if the prediction error is reduced using the one or more new features, then this feature set can be retained for future use.

Determining and/or identifying unresolved examples can include one or more of the following. Such examples can be output from running the predictive model and identifying cases where the predictive model fails. Additionally, a user can provide counter-examples (such as a house that has unusually low valuation). Also, textual and structured data can be streamed and/or periodically updated to identify one or more features that might not otherwise be anticipated.

In one or more embodiments of the invention, if a feature cannot be found through feature extraction or knowledge graph means, then underlying features can be used. For example, if features are lexical, then underlying features can include morphological features, syntactic features, or other features of words. If features are geographical, then underlying features can include more specific geographical features. Further, if features are temporal, then underlying features include more specific temporal features. The sequence of tokens or the position in the syntactic or semantic parse of a sentence can also be used. For example, when constructing a feature such as the number of bedrooms, the proximity between numeric values and nouns (such as "bedroom") in the sequence can be used, and features can be generated from the combination.

At least one embodiment of the invention can be implemented and/or embedded in a tool and/or user interface that presents correct and incorrect descriptions, identified noisy, error-prone, and/or mislabeled examples, proposed linguistic features shared among these examples, a mechanism for users to accept and/or reject proposed features, and a mechanism to generate a new predictive model upon user satisfaction.

Figure 2:
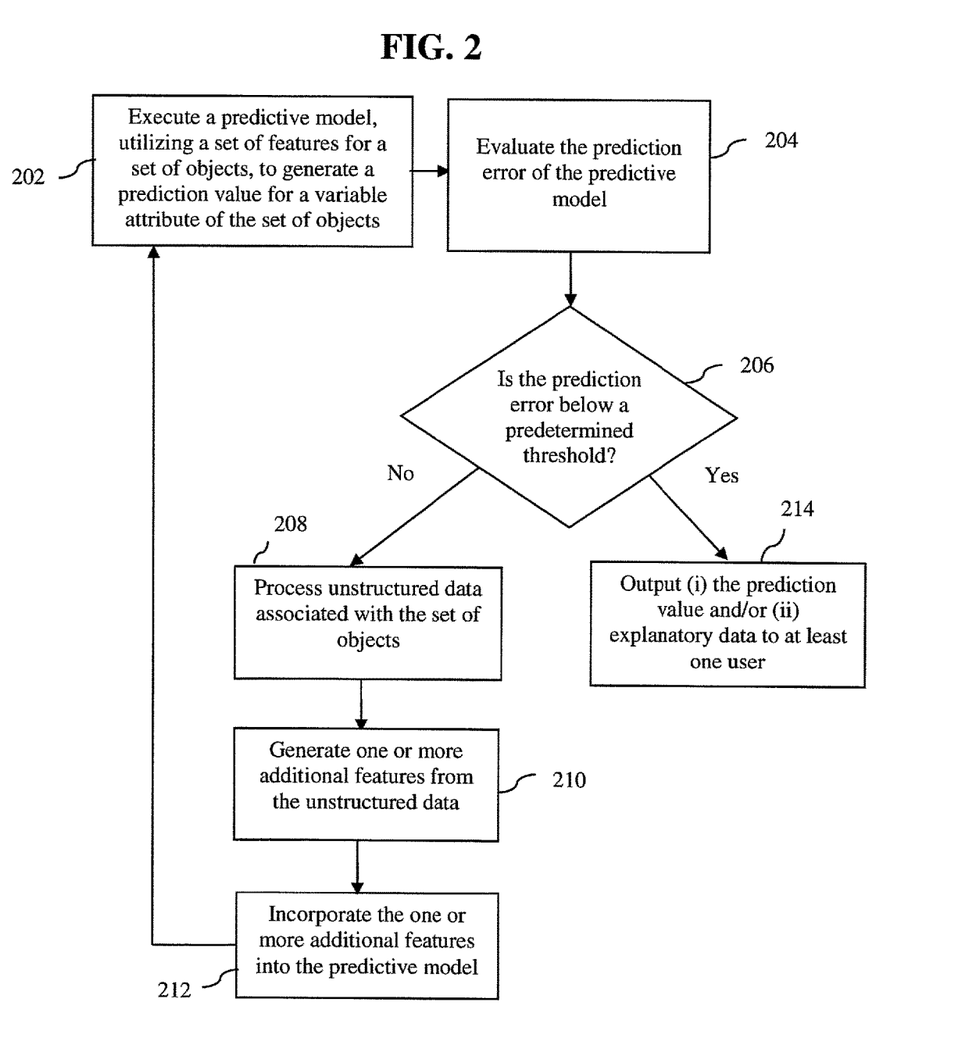
FIG. 2 is a flow diagram illustrating techniques, according to an embodiment of the invention.

FIG. 2 is a flow diagram illustrating techniques according to an embodiment of the present invention. Step 202 includes executing a predictive model, utilizing a set of features for a set of objects, to generate a prediction value for a variable attribute of the set of objects. By way of example only, a prediction value might be generated for house (object) prices (variable attribute) using features such as the number of bedrooms, the square footage, etc. Step 204 includes evaluating the prediction error of the predictive model.

Step 206 includes a decision point to determine whether the prediction error is below a predetermined threshold (for example, by comparing the prediction error of the predictive model to the predetermined threshold). In some embodiments, administrators can review the representation of the model and the prediction error. In some embodiments, users may be able to flag particular aspects. Referring specifically to step 206, if the result of the determination is "no," e.g., the prediction error exceeds a predetermined threshold, the process proceeds to step 208. Further, the techniques depicted in FIG. 2 can additionally include generating an additional set of features, from the set of unstructured data associated with the set of objects, upon a determination that the prediction error of the updated predictive model exceeds a predetermined threshold. The additional set of features can then be incorporated into the updated predictive model, thereby generating a further-updated predictive model, and a third prediction value can be generated for the variable attribute of the set of objects by executing the further-updated predictive model.

In step 208, unstructured data associated with the set of objects is processed. Such unstructured data can be associated with the set of objects and can include, for example, noisy data, error-prone data, and/or mislabeled data. In the above-noted house pricing prediction example, such unstructured data can include, for instance, text descriptions (or video, images, etc.) of houses including nearby geographical features, and/or proximity to sewers. Additionally, such unstructured data can also include a search result, a text column in a database, etc., such that the data are associated with the object(s) at question in the prediction task. The process next proceeds to step 210.

In step 210, the unstructured data can be processed to possibly identify one or more additional features (not in the existing prediction feature set). Such additional features can include, for example, the negation of a feature (that is, an existing feature that should be excluded). The process next proceeds to step 212.

In step 212, newly identified features can be incorporated into the predictive model. By way of example, only, incorporation of a newly identified features into the predictive model can include replacing one or more existing features with the newly identified features and/or adding the newly identified features to a set of existing features. The process can then return to step 202, as illustrated in FIG. 2.

Referring again to the decision point in step 206, if the result of the determination is "yes" (that is, the prediction error is below (does not exceed) a predetermined threshold), the process proceeds to step 214. Additionally, one or more embodiments of the invention can also include evaluating the prediction error of the further-updated predictive model based on said third generated prediction value (for example, by comparing the prediction error of the updated predictive model to the predetermined threshold), and outputting (i) the further-updated predictive model and/or (ii) the third generated prediction value to at least one user upon a determination that the prediction error of the further-updated predictive model is below the predetermined threshold.

In step 214, (i) the prediction value and/or (ii) one or more items of explanatory data pertaining to the updated predictive model (for example, the output on multiple examples (such as correct and incorrect predictions on the training set of examples) can be output to at least one user.

The techniques depicted in FIG. 2 can also include building the predictive model using an existing set of features. Additionally, one or more embodiments of the invention can include obtaining the existing set of features from a database containing knowledge graph data and/or obtaining the existing set of features via user input. Additionally, in at least one embodiment of the invention that implements the techniques depicted in FIG. 2, software can be provided as a service in a cloud environment.

Additionally, in at least one embodiment of the invention, evaluating the prediction error of the predictive model and evaluating the prediction error of the updated predictive model can include testing each of one or more sufficiency conditions. The sufficiency conditions can include, for example, improving speed, reducing the cost of acquiring a feature, and/or improving orthogonality of the feature space.

At least one embodiment of the invention (such as the techniques depicted in FIG. 2, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives feature selection information sent from a data source to the transmission server. The server can process the information, for example, based upon knowledge graph data that is stored in memory on the server and/or in a linked database. Subsequently, an alert is generated containing a proposed set of features. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 2 can also include providing a system, wherein the system can include one or more distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium containing instructions or code adapted to be executed to carry out at least one method step described herein via the system.

Additionally, the techniques depicted in FIG. 2 can be implemented via a computer program product that can include computer useable program code that is stored in a computer-readable storage medium in a data processing system, and wherein the computer useable program code was downloaded over a network from a remote data processing system. Also, in an embodiment of the invention, the computer program product can include computer useable program code that is stored in a computer-readable storage medium in a server data processing system, and wherein the computer useable program code is downloaded over a network to a remote data processing system for use in a computer-readable storage medium with the remote data processing system.

An embodiment of the invention or elements thereof can be implemented in the form of an apparatus including a memory and at least one processor that is coupled to the memory and configured to perform exemplary method steps. Examples of such an apparatus include, without limitation, a smart phone, computer or workstation.

Figure 3:
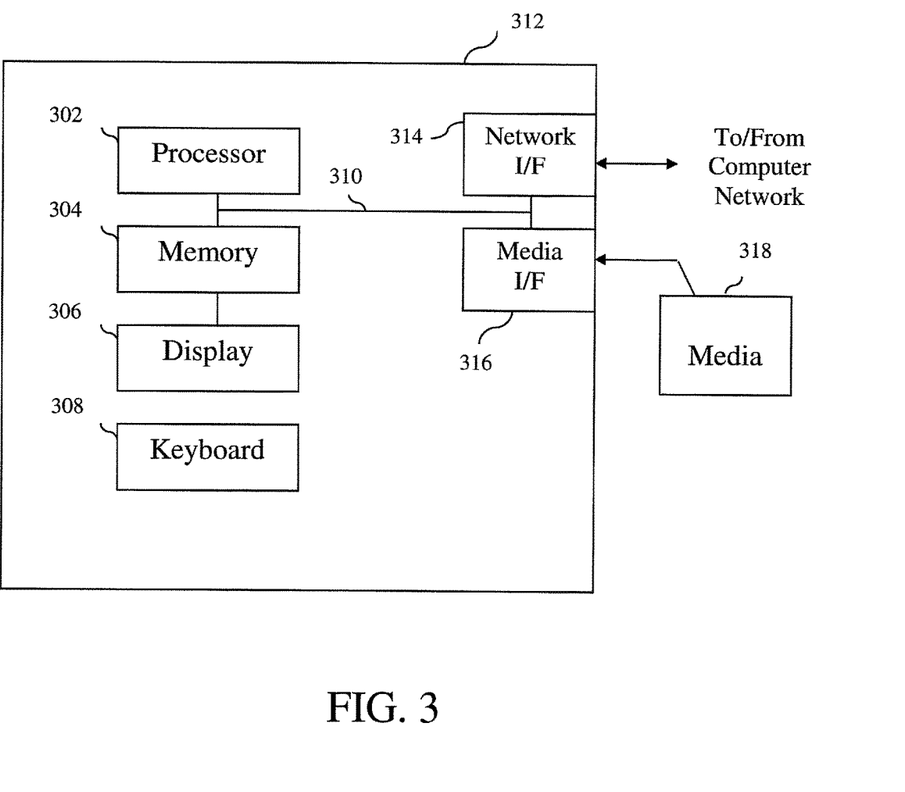
FIG. 3 is a system diagram of an exemplary computer system on which at least one embodiment of the invention can be implemented.

With reference now to FIG. 3, such an apparatus might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and executed on a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer-readable storage medium (or media) having computer readable program instructions thereon for causing a processor to carry out embodiments of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer-readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
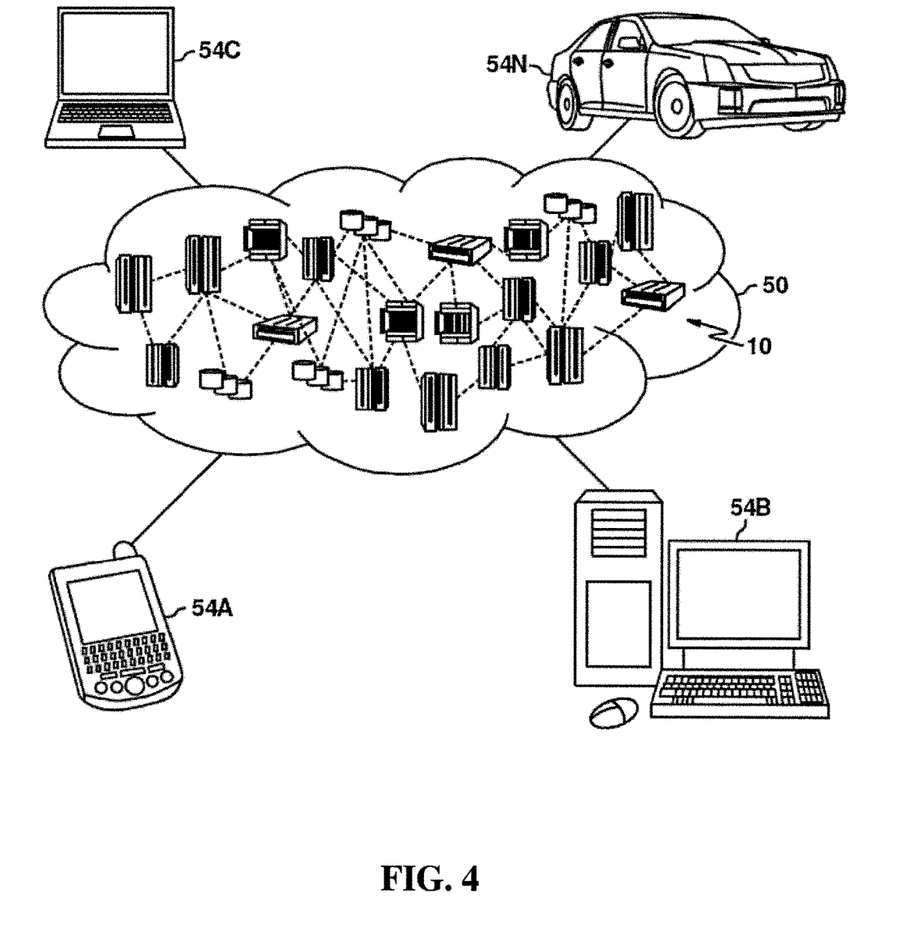
FIG. 4 depicts a cloud computing environment, according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
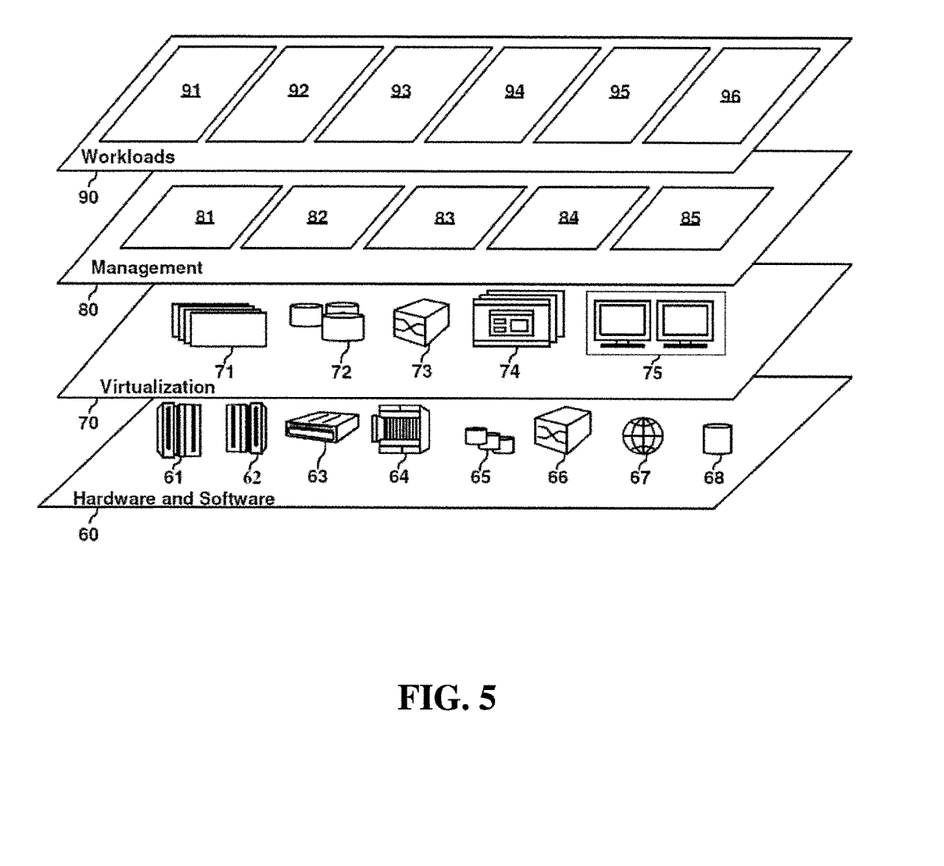
FIG. 5 depicts abstraction model layers, according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an updated prediction model generation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, a knowledge graph can provide utilizing relationships between concepts mentions in unstructured text descriptions derived from a knowledge graph to determine new features.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating a first prediction value for a variable attribute of a set of one or more objects by executing a predictive model, wherein the predictive model comprises a set of features for the set of objects;
   evaluating a prediction error of the predictive model based on said first generated prediction value, wherein said evaluating the prediction error of the predictive model comprises testing each of multiple sufficiency conditions, and wherein the multiple sufficiency conditions comprise (i) improving speed, (ii) reducing a cost of acquiring a feature, and (iii) improving orthogonality of a feature space corresponding to the set of features so as to reduce correlation among the set of features;
   generating one or more additional features, from a set of unstructured data associated with the set of objects, upon a determination that the prediction error of the predictive model exceeds a predetermined threshold;
   incorporating the one or more additional features into the predictive model, thereby generating an updated predictive model;
   generating a second prediction value for the variable attribute of the set of objects by executing the updated predictive model;
   evaluating a prediction error of the updated predictive model based on said second generated prediction value; and
   outputting the second generated prediction value to at least one user upon a determination that the prediction error of the updated predictive model is below the predetermined threshold.

2. The computer-implemented method of claim 1, comprising:
   outputting (i) the features of the updated predictive model and/or (ii) one or more items of explanatory data pertaining to the updated predictive model to the at least one user upon a determination that the prediction error of the updated predictive model is below the predetermined threshold.

3. The computer-implemented method of claim 1, comprising:
   building the predictive model using an existing set of features.

4. The computer-implemented method of claim 3, comprising:
   obtaining the existing set of features from a database containing knowledge graph data.

5. The computer-implemented method of claim 3, comprising:
   obtaining the existing set of features via user input.

6. The computer-implemented method of claim 1, comprising:
   comparing the prediction error of the predictive model to the predetermined threshold.

7. The computer-implemented method of claim 1, comprising:
   comparing the prediction error of the updated predictive model to the predetermined threshold.

8. The computer-implemented method of claim 1, wherein the set of unstructured data associated with the set of objects comprises at least one of noisy data, error-prone data, and mislabeled data.

9. The computer-implemented method of claim 1, wherein said incorporating the one or more additional features into the predictive model comprises replacing one or more existing features with the one or more additional features.

10. The computer-implemented method of claim 1, wherein said incorporating the one or more additional features into the predictive model comprises adding the one or more additional features to a set of existing features.

11. The computer-implemented method of claim 1, comprising:
    generating an additional set of at least one feature, from the set of unstructured data associated with the set of objects, upon a determination that the prediction error of the updated predictive model exceeds a predetermined threshold;
    incorporating the additional set of at least one feature and generating a further-updated predictive model;
    generating a third prediction value for the variable attribute of the set of objects by executing the further-updated predictive model;
    evaluating the prediction error of the further-updated predictive model based on said third generated prediction value; and outputting the third generated prediction value to at least one user upon a determination that the prediction error of the further-updated predictive model is below the predetermined threshold.

12. The computer-implemented method of claim 1, wherein software is provided as a service in a cloud environment.

13. A computer program product comprising a computer-readable storage medium having program instructions embodied therewith, the program instructions executable by a device to cause the device to:
generate a first prediction value for a variable attribute of a set of one or more objects by executing a predictive model, wherein the predictive model comprises a set of features for the set of objects;
evaluate a prediction error of the predictive model based on said first generated prediction value, wherein said evaluating the prediction error of the predictive model comprises testing each of multiple sufficiency conditions, and wherein the multiple sufficiency conditions comprise (i) improving speed, (ii) reducing a cost of acquiring a feature, and (iii) improving orthogonality of a feature space corresponding to the set of features so as to reduce correlation among the set of features;
generate one or more additional features, from a set of unstructured data associated with the set of objects, upon a determination that the prediction error of the predictive model exceeds a predetermined threshold;
incorporate the one or more additional features into the predictive model, thereby generating an updated predictive model;
generate a second prediction value for the variable attribute of the set of objects by executing the updated predictive model;
evaluate a prediction error of the updated predictive model based on said second generated prediction value; and
output the second generated prediction value to at least one user upon a determination that the prediction error of the updated predictive model is below the predetermined threshold.

14. The computer program product of claim 13, wherein the program instructions further cause the device to:
generate an additional set of at least one feature, from the set of unstructured data associated with the set of objects, upon a determination that the prediction error of the updated predictive model exceeds a predetermined threshold;
incorporate the additional set of at least one feature into the updated predictive model, thereby generating a further-updated predictive model;
generate a third prediction value for the variable attribute of the set of objects by executing the further-updated predictive model;
evaluate the prediction error of the further-updated predictive model based on said third generated prediction value; and
output the third generated prediction value to at least one user upon a determination that the prediction error of the further-updated predictive model is below the predetermined threshold.

15. The computer program product of claim 13, wherein the program instructions further cause the device to:
output (i) the features of the updated predictive model and/or (ii) one or more items of explanatory data pertaining to the updated predictive model to the at least one user upon a determination that the prediction error of the updated predictive model is below the predetermined threshold.

16. A system comprising:
a memory; and
at least one processor coupled to the memory and configured for:
generating a first prediction value for a variable attribute of a set of one or more objects by executing a predictive model, wherein the predictive model comprises a set of features for the set of objects;
evaluating a prediction error of the predictive model based on said first generated prediction value, wherein said evaluating the prediction error of the predictive model comprises testing each of multiple sufficiency conditions, and wherein the multiple sufficiency conditions comprise (i) improving speed, (ii) reducing a cost of acquiring a feature, and (iii) improving orthogonality of a feature space corresponding to the set of features so as to reduce correlation among the set of features;
generating one or more additional features, from a set of unstructured data associated with the set of objects, upon a determination that the prediction error of the predictive model exceeds a predetermined threshold;
incorporating the one or more additional features into the predictive model, thereby generating an updated predictive model;
generating a second prediction value for the variable attribute of the set of objects by executing the updated predictive model;
evaluating a prediction error of the updated predictive model based on said second generated prediction value; and
outputting the second generated prediction value to at least one user upon a determination that the prediction error of the updated predictive model is below the predetermined threshold.

17. The system of claim 16, wherein the at least one processor is further configured for:
generating an additional set of at least one feature, from the set of unstructured data associated with the set of objects, upon a determination that the prediction error of the updated predictive model exceeds a predetermined threshold;
incorporating the additional set of at least one feature into the updated predictive model, thereby generating a further-updated predictive model;
generating a third prediction value for the variable attribute of the set of objects by executing the further-updated predictive model;
evaluating the prediction error of the further-updated predictive model based on said third generated prediction value; and
outputting the third generated prediction value to at least one user upon a determination that the prediction error of the further-updated predictive model is below the predetermined threshold.

18. The system of claim 16, wherein the at least one processor is further configured for:
outputting (i) the features of the updated predictive model and/or (ii) one or more items of explanatory data pertaining to the updated predictive model to the at least one user upon a determination that the prediction error of the updated predictive model is below the predetermined threshold.

* * * * *